United States Patent [19]

Rider

[11] Patent Number: 4,520,669
[45] Date of Patent: Jun. 4, 1985

[54] CROSS-AXIS ACCELERATION COMPENSATION FOR ANGULAR RATE SENSING APPARATUS

[75] Inventor: Billie F. Rider, Cedar Rapids, Iowa

[73] Assignee: Rockwell International Corporation, El Segundo, Calif.

[21] Appl. No.: 402,522

[22] Filed: Jul. 28, 1982

[51] Int. Cl.³ .................. G01C 23/00; G01P 15/09
[52] U.S. Cl. .................. 73/510; 73/517 R; 73/178 R
[58] Field of Search .......... 73/510, 516 R, 517 R, 73/178 R

[56] References Cited

U.S. PATENT DOCUMENTS 4,457,173  7/1984  Hunter .................. 73/510

Primary Examiner—James J. Gill
Attorney, Agent, or Firm—Edward A. Gerlaugh; George A. Montanye; H. Fredrick Hamann

[57] ABSTRACT

A low-cost, two-axis rate and acceleration sensor utilizing piezoelectric generator elements affixed to the rotating housing of an inside-out synchronous motor. Signals generated by the piezoelectric bender elements are amplified, compensated, balanced, and converted to FM signals for transmission off the rotating assembly.

6 Claims, 10 Drawing Figures

CROSS-AXIS ACCELERATION COMPENSATION FOR ANGULAR RATE SENSING APPARATUS

BACKGROUND OF THE INVENTION

This invention relates generally to reference apparatus for navigable vehicles such as aircraft, and more particularly, to rate/acceleration sensors used in an attitude and heading reference system. Advancement in the art of precision flight control and guidance apparatus for aircraft, missiles, and space vehicles depends in part on progress in sensor technology. Present computer technology allows sophisticated and complex signal processing at reasonable cost, but the information processed is frequently derived from sensors having a cost which is a disproportionate part of the system cost.

A reference system having inertial instruments rigidly fixed along a vehicle-based orientation reference wherein the instruments are subjected to vehicle rotations and the instrument outputs are stabilized computationally istead of mechanically is termed a gimballess or strapped-down system. Such systems generally include computing means receiving navaid data such as magnetic and radio heading; air data such as barometric pressure, density, and air speed; along with output signals of the inertial instruments for generating signals representative of vehicle position and orientation relative to a system of coordinate axes, usually earth oriented. The presence of high angular rates assocaited with strapped-down systems adversely affects performance and mechanization requirements. Consequently, such reference systems have been used extensively in missiles, space, and military vehicles, but their use in commerical aircraft has been less extensive because of economic constraints associated with the manufacture of precision mechanical assemblies, i.e., gyroscopes and other precision sensors. Strapped-down inertial reference systems become practical for commercial aircraft from the standpoint of cost of ownership, weight, reliability, and maintainability with the advent of small, lightweight, highly accurate and relatively low-cost rate sensors and accelerometers. Angular rate sensing apparatus utilizing rotating piezoelectric generators are known; see for example U.S. Pat. Nos. 2,716,893 and 4,197,737. Such devices generally comprise piezoelectric generator elements mounted to a rotatable drive shaft and oriented for generating signals responsive to particular bending forces sensed by the instrument; the processing of signals derived form such instrumentation involves the measurement, amplification and transmission of very low level DC and low frequency signals. Prior art devices have exhibited signal degradations which make the devices unsuitable for some applications. For example, the signals being processed may contain undesirable carrier harmonics, DC bias, and other noise components, such as those caused by signal phase shifts and mechanical misalignments in the system, which undesirable components must be rejected to prevent degradation of the low-level signals of primary interest.

In view of the problems of present state-of-the-art sensors, described above, it is a general objective of the present invention to develop an improved low-cost sensor for generating signals representative of vehicle accelerations and angular rates.

A more specific object of the invention is to provide an improved sensor for measuring angular rate about two axes and having relatively simple mechanical construction, low bias drift, and high sensitivity.

It is another object of the present inventon to provide an improved angular rate sensor wherein signals resulting from undesired acceleration sensitivity due to mechanical misalignment and externally applied vibrations are virtually eliminated.

SUMMARY OF THE INVENTION

In accordance with one aspect of the invention, there is provided an improved, low cost and compact sensor assembly which utilizes a piezoelectric generator bender element mounted exteriorly on a rotating element for sensing coriolis accelerations developed when the spin axis of the sensor assembly is rotated in space. Circuits mounted on the rotating element amplify and convert the low-level DC signals generated by the bender element for coupling off the rotating element. Undesired signals representative of cross-axis accelerations sensed by the bender element are compensated for by adding two additional accelerometers angularly displaced from each other which sense accelerations in a plane perpendicular to the spin axis; a signal representative of a cancelling vector equal and opposite to the cross-axis acceleration signal is formed by selectively applying signal components of predetermined amplitude and polarity of the output signals generated by the additional accelerometers to a summing junction along with the signal generated by the bender element.

BRIEF DESCRIPTION OF THE DRAWINGS

The invention is pointed out with particularlity in the appended claims; however, specific objects, features, and advantages of the invention will bcome more apparent and the invention will best be understood by referring to the following description of the preferred embodiment in conjunction with the accompanying drawings, in which:

DESCRIPTION OF THE PREFERRED EMBODIMENT

Figure 1:
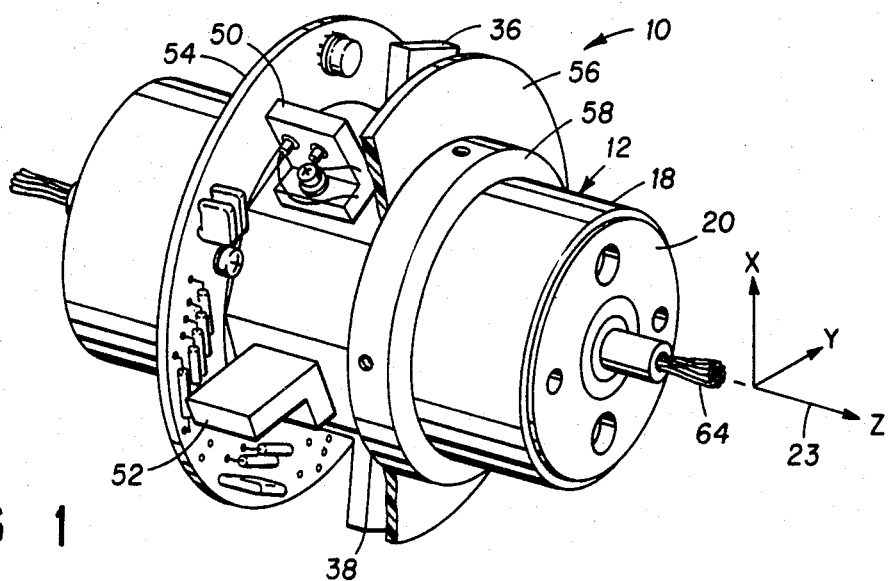
FIG. 1 is a pictorial view, partially cut away, of a sensor assembly in accordance with the present invention.
Figure 2:
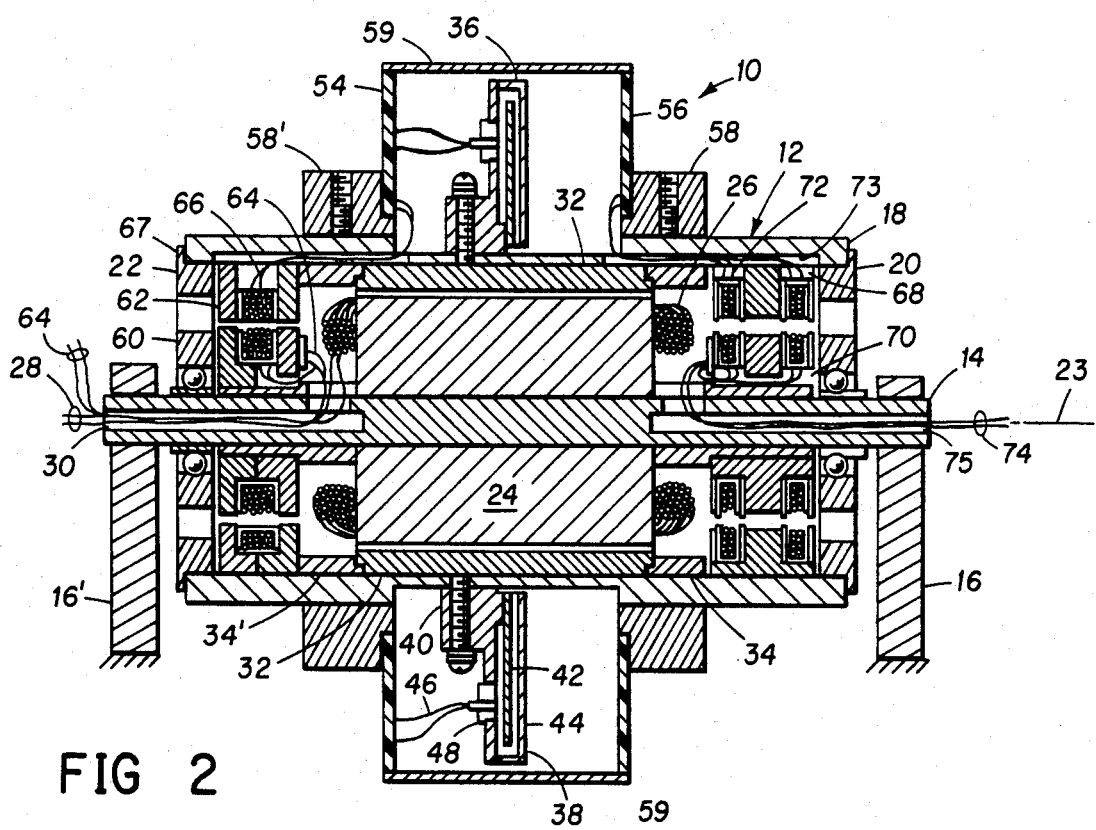
FIG. 2 is a section view of a sensor assembly in accordance with the instant invention.

Referring now to the various views of the drawing for a more detailed description of the components, materials, construction, operation and other features of the invention by characters of reference, FIGS. 1 and 2 show a sensor assembly 10 constructed in accordance with the present invention. The sensor assembly 10 comprises a hysteresis motor 12 having a fixed axial shaft 14. The shaft 14 is mounted and rigidly affixed, at either end thereof, to a structural member 16, 16[1] having an orientation fixed with respect to a vehicle (not shown) in which the sensor assembly 10 is installed. A rotating element of the motor 12 comprises a cylindrical motor housing or sleeve 18 journaled for rotation about the shaft 14 on bearings 20, 22, the spin axis 23 of the sleeve 18 being coaxial with the shaft 14. The bearings 20, 22 are endcap roller bearings bonded with a preload to the shaft 14 and pressed into the ends of the motor housing 18. A stator 24 and its associated windings 26 surrounds the shaft 14 and is affixed thereto. Leads 28 for supplying alternating current to the stator windings 26 emanate from the motor via a central bore 30 in the shaft 14. A cylindroid hysteresis ring 32 of magnetic material is mounted interiorly of the motor housing 18 for rotation therewith between a pair of ring spacers 34, 34[1]. The spacers 34, 34[1] are made from a non-magnetic material such as austenitic stainless steel, the preferred material being 304 stainless steel. The hystersis ring 32 is juxtaposed with the stator 24, driving the rotating element in response to alternating current applied to the leads 28 of the stator windings 26. The motor housing 18 is made from martensitic stainless steel such as 416 stainless steel. The materials were chosen to keep the bearing thermal expansion loop matched with respect to coefficient of expansion so as to maintain the bearing preload over temperature extremes. A motor such as the motor 12 having a fixed shaft and stator, and an externally disposed rotating structure, is termed an inside-out motor.

A pair of piezoelectric (PE) crystal assemblies 36, 38 are mounted exteriorly on the rotating motor housing 18 on opposide sides thereof. Each of the crystal assemblies 36, 38 comprises a base 50 to which a piezoelectric bender element 42 is mounted in cantilever fashion. A cover 44 in cooperation with the base 40 extended encloses the bender element 42. Leads 46 conduct output signals generated by the piezoelectric bender elements 42 via feedthrough terminals 48 to electronic circuits carried on the rotating element of the sensor assembly 10. The piezoelectric bender element 42 of the presently-described embodiment is the same as decribed in my co-pending U.S. patent application Ser. No. 276,112, now U.S. Pat. No. 4,443,729, entitled *Piezoelectric Sensor* assigned to the same assignee as the present invention, which application is incorporated herein by reference.

Referring still to FIG. 1, a second pair of piezoelectric crystal assemblies 50, 52 are shown mounted exteriorly on the rotating motor housing 18 for measuring accelerations in a plane perpendicular to the spin axis 23 of the sensor assembly 10. The crystal assemblies 50, 52 are mounted having bending axes thereof essentially parallel with the spin axis 23 of the sensor assembly 10, and axes of sensitivity essentially perpendicular to the spin axis 23. "Essentially parallel" and "essentially perpendicular" mean as parallel and as perpendicular as manufacture will reasonably allow, but including some slight misalignment which may be detected in output signals generated by the crystal assemblies. While the crystal assemblies 50, 52, are shown mounted orthogonally of each other, they can be mounted with their axes of sensitivity displaced with respect to each other by any angle, or one could be omitted; however, a nominal 90° separation between two crystal assemblies is the preferred arrangement for reasons which will be explained hereinafter.

A pair of annular circuit boards 54, 56 are mounted exteriorly of the motor housing 18 for rotation therewith by any suitable means such as collars 58, 58[1]. A cylindrical plate 59 (see FIG. 2) extending between the peripheral ends of the circuit boards 54, 56 encloses the space therebetween, serving as a dust cover for the circuit devices carried on the boards. The enclosure formed by the circuit boards 54, 56 and the plate 59 protects the PE crystal assemblies 36, 38, 50, 52 from turbulent air currents which could be generated if the rotating components were not so protected. Referring to FIG. 2, an annular, air-gap power transformer having a stationary primary coil 60 affixed to the shaft 14, and a rotating secondary coil 62 concentric with the primary coil 60 and mounted inside the rotating sleeve 18 supplies power to electronic circuits on the circuit boards 54, 56. Power leads 64 transmitting alternating current are routed through the central bore 30 of the shaft 14 and connected to the primary coil 60 of the power transformer. Similarly, power leads 66 from the secondary coil 62 of the transformer are routed via a slot 67 in the motor housing 18 to the circuit boards 54, 56. An annular, air-core signal transformer having a primary coil 68 mounted inside the sleeve 18 for rotation therewith and a secondary coil 70 affixed to the shaft 14 couples output signals of circuits (components of which are shown in FIG. 1) on circuit boards 54, 56 via leads 72 routed through a slot 73 in the sleeve 18 to the primary coil 68, and from the secondary coil 70 via leads 74 routed through a central bore 75 of the shaft 14 to user circuits external of the sensor assembly 10.

Figure 3:
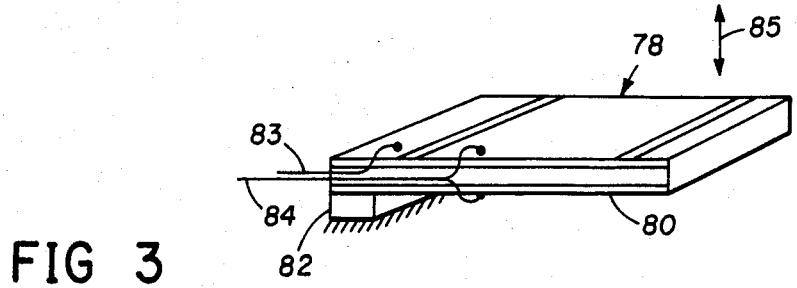
FIG. 3 is a pictorial view of a piezoelectric bender element utilized in the practice of the invention.

Referring now to FIG. 3, there is shown in greater detail a piezoelectric bender element 78 like the bender elements 42 of FIG. 2. The bender element 78 comprises a cantilevered piezoelectric-crystal sensor 80 affixed to a mounting member or base 82. The bender element 78 generates a voltage $V_o$ on output leads 83, 84 which is proportional to the bending moment generated by accelerations acting on the mass of the sensor 80 itself along an axis of sensitivity illustrated by the line 85, the bending axis of the bender element 78 being in the plane of the sensor 80 and parallel with the longitudinal dimension of the base 82. The bender element 78 is inherently sensitive without the addition of proof mass. Additional details relating to construction and operation of the bender element 78 may be found in the aforementioned co-pending application Ser. No. 276,112.

Referring to FIG. 1, the desired accelerations are available when the piezoelectric bender elements 36, 38, 50, 52 are rotated at a fixed frequency, 3120 revolutions per minute in the presently described embodiment, about the spin axis 23 as shown in FIG. 1.

A measurement of linear acceleration is accomplished simply by measuring the phase and amplitude of the AC signal obtained by rotating the bender elements 50, 52 in the plane of interest. For rate measurement, the piezoelectric bender elements 36, 38 are oriented as shown in FIGS. 1 and 2 to sense acceleration along the spin axis 23. The bender elements 36, 38 are rotated at the fixed spin frequency, N, in radians per second, the spin axis 23 being oriented and fixed, for example, along the roll axis of an aircraft, and the sensor assembly 10 measures pitch and yaw rate. As the aircraft experiences an angular rate perpendicular to the spin axis, a useful coriolis acceleration along the spin axis acts on the mass of the bender elements 36, 38. At a point (r, α) on the bender element, the acceleration along the spin axis is given by $$a = 2Nr\dot{\theta}\cos(Nt-\alpha) + 2Nr\dot{\psi}\sin(Nt-\alpha) \quad (1)$$

where $\theta$ and $\psi$ are pitch and yaw rates, r is the radial distance from the spin axis to the point on the bender element and α is the angular location of the point on the bender element from the axis about which angular rate is being sensed. A sinusoidal output voltage $V_o$ is generated by the bender element as a result of the force and stress exerted on the piezoceramic material therein. The output voltage is of the form:

$$V_o = K\dot{\theta}N\cos Nt + K\dot{\psi}N\sin\sin Nt \quad (2)$$

where K is a sensitivity constant for the bender element, $\theta$ represents the angular displacement or tilt of the spin axis in the Y-Z plane, and $\psi$ represents the angular displacement or tilt of the spin axis in the X-Z plane. $\dot{\theta}$ and $\dot{\psi}$ are, respectively, $d\theta/dt$ and $d\psi/dt$ or angular rates, respectively, about the Y-axis and the X-axis as shown in FIG. 1. In the utilizing circuits, the output voltage $V_o$ is phase detected and measured to determine the desired rates $\dot{\theta}$ and $\dot{\psi}$. $V_o$ is an inherently bias-free AC signal; signal-to-noise ratios of several dB are exhibited at input rates equivalent to earth rate or less.

Figure 5:
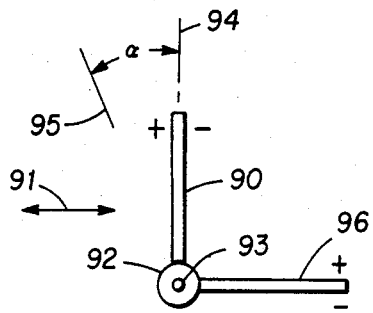
FIG. 5 is a diagramatic representation of linear acceleration sensors useful in explaining the operation of the present invention.

FIG. 5 illustrates an elementary form of a two-axis linear accelerometer such as the PE crystal assemblies 50, 52 of FIG. 1. An acceleration-sensitive device 90 such as a piezoelectric bender element having an axis of sensitivity along a line 91 is affixed to a rotating element or shaft 92 rotating at an angular velocity $\omega_n$ about a spin axis 93. Acceleration components anywhere in the plane perpendicular to the spin axis 93 (the plane of the paper in FIG. 5) are measured; since such a plane is defined by two axes, the illustrated sensor is referred to as a two-axis accelerometer. Assuming that FIG. 5 shows the acceleration-sensitive element 90 at a reference time $\omega_n t = 0$; that a force on the positive (+) side of the element 90 generates a positive voltage proportional to the force; and that the force is local acceleration a(t) acting on the mass of the acceleration-sensitive device 90, then because of the rotation, the voltage generated is of the form:

$$v_1 = K\, a(t) \sin(f_n t + \alpha) \quad (3)$$

where K is a scale factor, a(t) is the local acceleration, α is an angle between a reference axis 94 of the acceleration-sensitive device 90 and the acceleration force a(t), the latter represented by a line 95. A utilizing means would typically measure the amplitude and phase of the voltage generated by the acceleration-sensitive device 90 to determine the amplitude and direction of the acceleration a(t); however, a problem arises when the measured acceleration contains a component at a frequency $2\omega_n$ as well as the normally steady-state or low frequency acceleration (g) which is the quantity of interest to be measured. That is, if $$a(t) = g + a_1 \sin 2\omega_n t \quad (4)$$

the voltage generated with reference to equation (3) contains a term which renders g indistinguishable from the $2\omega_n$ acceleration components. The problem is pervasive since rotating elements such as the rotating element 92 characteristically comprise ball bearings which commonly generate a $2\omega_n$ acceleration component.

The scale factor of the acceleration sensor is not determined by the spin speed of the sensor assembly since no coriolis is involved, the coriolis term being perpendicular to the sensitive axis of the acceleration sensor. Assuming that a constant acceleration (such as gravity) component exists along the line 91, the acceleration sensor 90 is bent by its own weight, and the bending direction is the same direction as the shaft 92 rotation. After the shaft 92 rotates 180°, the bending moment is essentially equal and opposite; therefore, a sinusoidal output signal is generated, the amplitude and phase depending on the relative direction of the g field in the sensitive plane. The accelerometer sensitivity has the form:

$$Q\bigg|_\alpha = d_{31} PW(\chi_2 - \chi_1)^3 a_{xy}(t) \cos(nt - \alpha) \quad (5)$$

Note that n is not a scale factor, and that $(\chi_2 - \chi_1)$ is the length of the active sensor. If the acceleration $a_{xy}(t)$ is a sinusoidal vibration $\omega_a$, the charge output has a sinusoidal component at frequencies $(\omega_a + N)$ and $(\omega_a - N)$. For most frequencies, these terms do not result in steady-state outputs., however, certain harmonic frequencies such as $\omega_a = 2n$ cause potentially serious performance problems. At $\omega_a = 2n$ a 1n signal and a 3n signal are generated. The 3n signal is rejected, but the 1n signal has the appearance of steady-state acceleration.

In order to measure the nominally steady-state component g in the presence of a $2\omega_n$ term, a second acceleration-sensitive device 96 is mounted to the rotating structure 92 and oriented at 90° from the first device 90 as shown in FIG. 5. The devices 90, 96 may be angularly displaced from each other by any non-zero angle, however, a 90° offset is preferred. If the sensitivity of the devices 90, 96 are virtually identical and the devices 90, 96 are physically oriented 90° apart, the $2\omega_n$ component will be cancelled if the output signal from the second acceleration-sensitive device 96 is shifted in phase by 90° and added to the output signal from the first device. Assume that a local gravity field g exerts a force along the null axis 94 of the sensor 90 at $\omega t = 0$, and that a positive force on the + side of the sensors 90, 96 generates, respectively, positive voltages $v_1$ and $v_2$. Because the rotating element 92 rotates at an angular velocity $\omega_n$, the sensor assembly acts as a modulator, and $$v_{out} = K\, a(t) \sin \omega_n t \quad (6)$$

Let $$a(t) = g + H \sin(2\omega_n t + \beta) \quad (7)$$

Then $$v_1 = [g \sin \omega_n t + H \sin(2\omega_n t + \beta \sin \omega_n t] K_1 \quad (8)$$

$$v_2 = [g \cos \omega_n t + H \sin(2\omega_n t + \beta) \cos \omega_n t] K_2 \quad (9)$$

Using the identities $$\sin\alpha \sin\beta = \tfrac{1}{2}\cos(\alpha-\beta) - \tfrac{1}{2}\cos(\alpha+\beta) \quad (10)$$

$$\sin\alpha \cos\beta = \tfrac{1}{2}\sin(\alpha+\beta) + \tfrac{1}{2}\sin(\alpha+\beta) \quad (11)$$

Then $$v_1 = [g \sin \omega_n t + H/2 \cos (\omega_n t + \beta) - H/2 \cos (3\omega_n t + \beta)] K_1 \quad (12)$$

$$v_2 = [g \cos \omega_n t + H/2 \sin (\omega_n t + \beta) + H/2 \sin (3\omega_n t + \beta)] K_2 \quad (13)$$

With only one sensor 90 or 96, H corrupts the apparent applitude and phase of the acceleration vector g, and a $3\omega_n$ signal is generated and must be rejected. Ignoring in this instance the $3\omega_n$ component, cancellation of the H terms is accomplished if $v_2$ is delayed 90° electrically, whereby $v_2$ delayed becomes $v_{22}$ and $$v_{22} = [g \sin \omega_n - H/2 \cos (\omega_n t + \beta)] K_{22} \quad (14)$$

$$v_1 = [g \sin \omega_n t + H/2 \cos (\omega_n t + \beta)] K_1 \quad (15)$$

adding (14) and (15) cancels the H terms if the scale factors $K_1$ and $K_{22}$ associated with the sensors 90, 96 are identical.

Figure 6A:
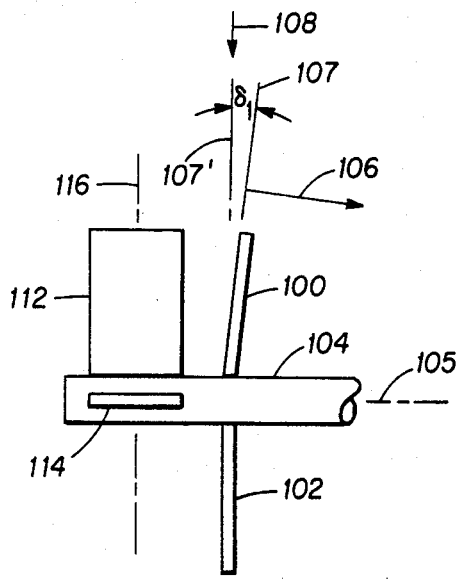
FIGS. 6A and 6B are diagramatic representations of angular rate and linear acceleration sensors useful in explaining the operation of the present invention.

Referring again to FIG. 1, undesirable accelerations occurring in the spin plane (X,Y) of the sensor assmbly 10 which may be caused by mechanical misalignments in the sensor assembly 10 and/or externally applied vibrations, apply force along the length of the rate sensors 36, 38. If the electrical null axis of the sensors 36, 38 is exactly in the X,Y plane, no output signal resulting from the unwanted accelerations is generated; however, such exactness is achieved only through precision mechanical assembly which precludes low-cost implementation. The present invention achieves low-cost implementation by providing electronic means for compensating for imprecise mechanical construction. Referring now to FIG. 6A, there is shown a simplified diagram of a pair of piezoelectric bender elements 100, 102 mounted on a rotating member 104 having a spin axis along a line 105. The spin axis 105 is parallel with coriolis acceleration components to be measured by the bender elements 100, 102, the coriolis accelerations being developed when the spin axis 105 is rotated in space. The resulting acceleration is proportional to the rate of rotation of the rotating member 104 and is a well-known phenomenon. Referring now to the bender element 100 of FIG. 6A (the description, however, being applicable to either element 100, 102), the bender element 100 is mounted on the rotating member 104 such that an acceleration sensitive axis 106 of the sensor 100 is essentially parallel with the spin axis 105, i.e., as parallel as mechanical construction will allow, but shown considerably offset in the drawing for illustrative purposes. A null axis 107 of the sensor 100 exists such that steady-state or low frequency (relative to the resonant frequency of the sensor 100) accelerations along the null axis 107 generate no output signals from the sensor 100. On the other hand, acceleration components along the acceleration-sensitive axis 106 result in the generation of an electrical signal $V_c$ in the sensor 100 which is of the form:

$$V_c = K\phi\omega_n \sin (\omega_n t + \alpha) \quad (16)$$

Figure 6C:
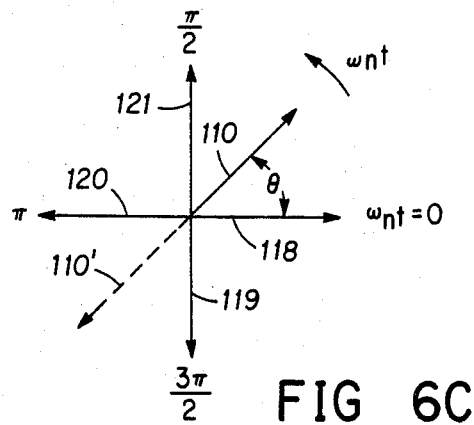
FIG. 6C is a vector diagram useful in explaining the operation of the present invention.
Figure 6B:
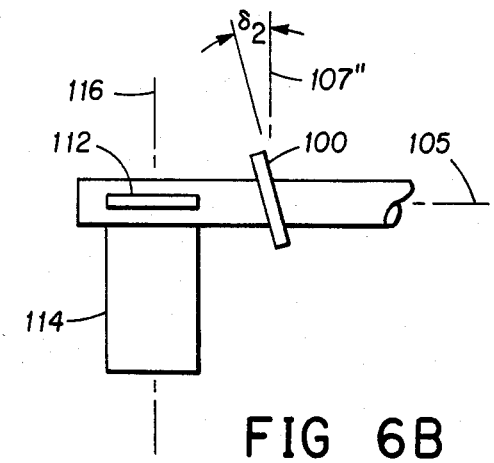
Figure 6D:
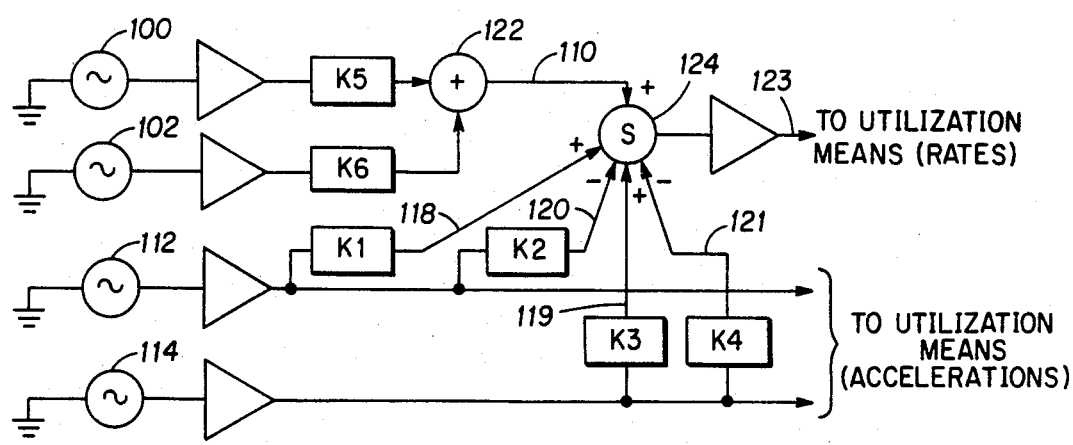
FIG. 6D is a simplified blocx diagram of one embodiment of compensation means utilized in the present invention.

When the sensor 100 is misaligned by an angle $\delta_1$, from a true null axis $107^1$ of the assembly as shown in FIG. 6A and/or by an angle $\delta_2$ from a true null axis $107^{11}$ as shown in FIG. 6B, and if a cross-axis acceleration 108 exists, then the sensor 100 generates a signal $V_{ca}$ responsive to the cross-axis acceleration 108 which is of the form:

$$V_{ca} = K a\delta \sin (\omega_n t + \alpha) \quad (17)$$

where $\alpha$ is a phase shift dependent on the orientation of the misalignment. Under certain circumstances, the signal output resulting from the misalignments $\delta_1$ and $\delta_2$ are indistinguishable from the desired signal. Misalignments $\delta_1$ and $\delta_2$ can be eliminated or reduced to tolerable levels by precise mechanical construction; however such precision construction is costly. Referring now to FIGS. 6A–C, FIG. 6C is a simplified vector diagram representative of the output signals developed by a misaligned acceleration-sensitive components such as the sensor 100. The existence of misalignments $\delta_1$ and $\delta_2$ results in an interfering signal represented by the vector 110. An interfering signal such as the signal 110 can be expected to be of random phase for non-precision assembly, i.e., the signal 110 may fall in any quadrant of the FIG. 6C diagram. Means must therefore be provided which compensate for an interfering signal at any angle. Cross-axis acceleration compensation is accomplished in accordance with the present invention by two additional acceleromters 112, 114 mounted on the rotating member 104. The accelerometers 112, 114 measure the accelerations in the entire plane 116 perpendicular to the spin axis 105. While the accelerometers 112, 114 are shown angularly displaced from each other by 90°, they can be mounted at any non-zero angle with respect to each other; however, a nominal 90° separation is the preferred alignment. Referring still to FIGS. 6A–C, it is assumed that the accelerometers 112, 114 are aligned such that they nominally generate signals represented by vectors 118 and 119. Opposing vectors 120 and 121 may be generated by inverting, respectively, signals representative of the vectors 118 and 119; since the offending vector 110 can fall in any quadrant, a cancelling vector $110^1$ must be configurable for any quadrant. A cancelling vector can be generated in any quadrant by effecting the sums of selected ones of the four vectors 118, 119, 120, 121 of sufficient amplitude to form the desired vector. In the example illustrated in FIG. 6C, the cancelling vector $110^1$ is generated by selecting proper amplitudes of the $3\pi/2$ vector 119 and the $\pi$ vector 120. Referring now to FIG. 6D, the acceleration-sensitive devices 100, 102, 112, 114 described with reference to FIGS. 6A and 6B, are represented in FIG. 6D as sine wave generators 100, 102, 112, 114. The output signals of the rate sensors 100, 102 are combined after amplification in amplifiers having respective gains K5 and K6 in a summing means 122, the output signal of the summing means 122 comprising a desired signal 123 representative of the sensed angular rates plus the interfering signal 110. The output signals of the acceleration sensors 112, 114 are utilized to form the cancelling vector $110^1$ by adjusting the appropriate gains K1, K2 corresponding respectively with the positive and negative output signal vectors 118, 120 of acceleration sensor 112, and gains K3, K4 corresponding respectively with the positive and negative output signal vectors 119, 121 of acceleration sensor 114, and selectively applying these signals to a summing means 124 along with the summed output signals of the angular rate sensors 100, 102. In the summing means 124, the cancelling vector $110^1$ compensates for the interfering vector 110, and the output signal 123 consequently comprises only the desired angular rate components.

Figure 4:
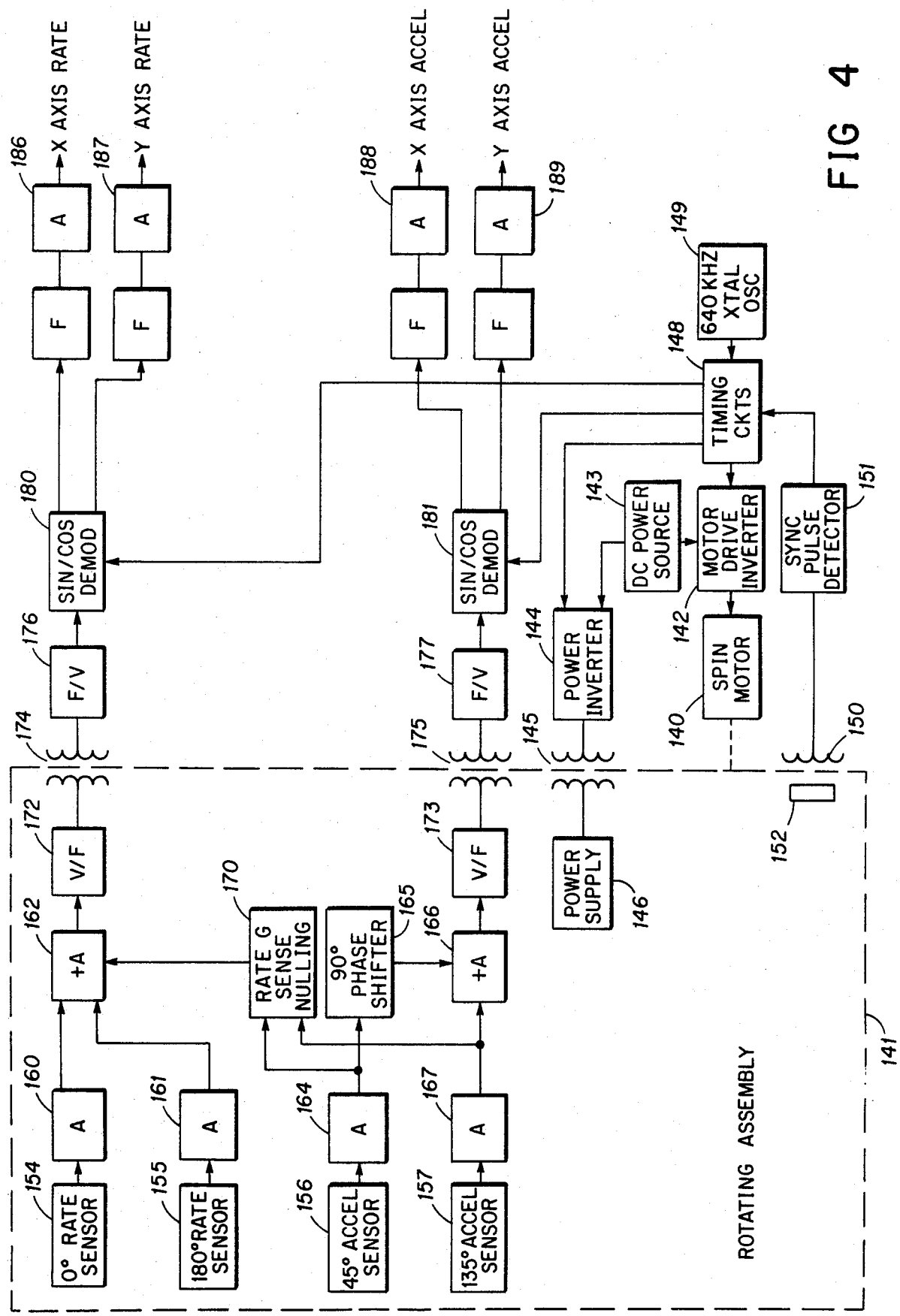
FIG. 4 is a schematic block diagram of the sensor assembly including circuit elements, both on and off the rotating structure, associated therewith.

FIG. 4 is a simplified block diagram of a two-axis rate and acceleration sensor assembly such as the sensor assembly 10 of FIG. 1, and the circuits associated therewith. THe sensor assembly comprises a spin motor having a fixed stator assembly represented by the block 140 and a rotating assembly 141; circuits carried on the rotating assembly 141 are mounted on annular printed circuit boards previously described with reference to FIG. 1. The spin motor is a hysteresis synchronous motor driven by an inverter 142 operating from a regulated DC power source 143. A power inverter 144 serves as an AC power source for the circuits on the rotating assembly 141, the AC being coupled via an air-gap transformer 145 to a power supply 146 on the rotating assembly 141. The power supply 146 rectifies and filters the AC and supplies DC operating voltage to the circuits carried on the rotating assembly 141. Timing circuits 148 generate control signals and timing pulses for synchronizing and controlling the operation of the sensor circuits. The timing circuits 148 receive an input derived from a precision clock source, such as a 640 kHz crystal oscillator 149 shown in the presently described embodiment. A synchronizing signal representative of the position of the rotating assembly 141 with respect to the fixed elements of sensor assembly is coupled from a transducer 150 via a sync pulse detector 151 to the timing circuits 148. The source of the synchronizing signal may be a magnetic element 152 affixed to the rotating assembly to which the transducer 150, e.g. a variable-reluctance coil, is responsive as the magnetic element 152 passes the fixed element 150. The position reference of the rotating assembly 141 may be generated alternatively by any suitable means such as optoelectronic devices.

Four miniature piezoelectric bender elements 154, 155, 156, 157 mounted on the rotating assembly 141 are used to sense the acceleratons of interest. Two sensors 154, 155 are oriented with their sensitive axes parallel to the spin axis (as previously shown with reference to FIG. 1) to measure coriolis acceleration proportional to rates of turn about selected axes perpendicular to the spin axis. Two other sensors 156, 157 are mounted with their sensitive axes perpendicular to the spin axis for measuring linear accelerations in the plane perpendicular to the spin axis. Sinusoidal electrical signals generated by the rate sensors 154, 155 are coupled, respectively, via buffer amplifiers 160, 161 to a summing amplifier 162. Output signals generated by the acceleration sensor 156 are coupled via a buffer amplifier 164 and a 90° phase shift circuit 165 to a summing amplifier 166; output signals generated by the acceleration sensor 157 are coupled via a buffer amplifier 167 to the summing amplifier 166. A rate G-sense nulling circuit 170 provides means for coupling selectable portions of the signals generated by the acceleration sensors 156, 157 to the summing amplifier 162 for cancelling undesired signals representative of cross-axis accelerations sensed by the rate sensors 154, 155. The output signals of the summing amplifiers 162, 166 drive, respectively, two linear voltage-to-frequency converters 172, 173 which generate a frequency-modulated pulse train and serve to transmit the FM signals off the rotating assembly 141 via air-core transformers 174, 175. The frequency-modulated pulses are converted back to analog voltages in frequency-to-voltage converters 176, 177. The regenerated signals output from the frequency-to-voltage converters 176, 177 are sinusoidal at the spin frequency of the rotating assembly 141, having amplitude and phase representative of the respective rate and acceleration components sensed by the rotating crystal assemblies. Sin/Cos demodulators 180, 181 regenerate the analog voltages representative, respectively, of angular rate about two axes, and linear acceleration along two axes. Timing signals from the timing circuits 148 control the regeneration of the analog voltages; the synchronizing signal from the sync pulse detector 151 allows adjustment of the phase of the demodulator sampling function to compensate for phase shifts in the system. The demodulator 180, 181 output signals are filtered to remove the carrier (spin frequency) harmonics, and are coupled to an external user device such as an aircraft attitude and heading reference system via buffer amplifiers 186, 187, 188, 189.

Figure 7:
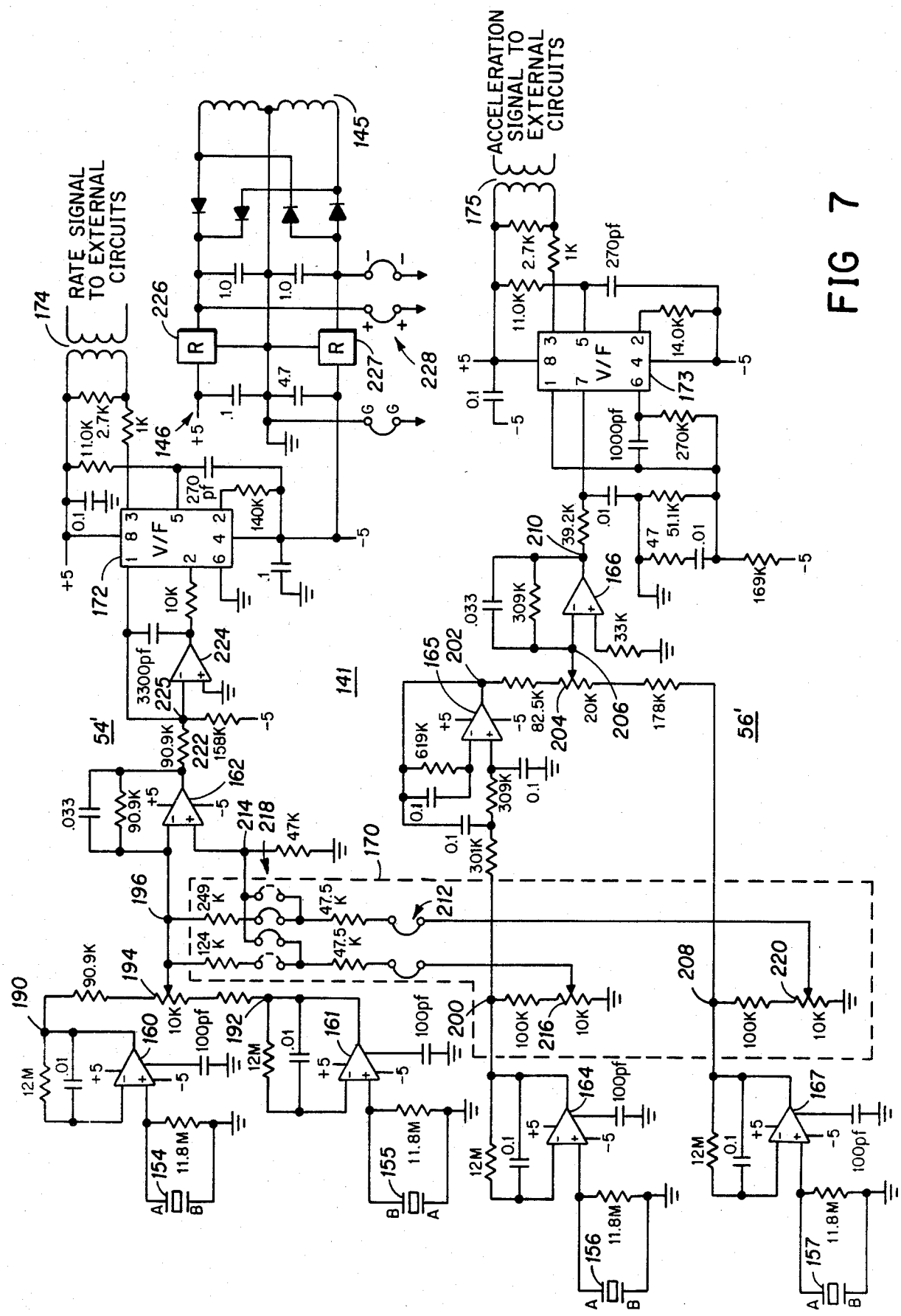
FIG. 7 is a detailed electrical schematic diagram of the sensor assembly of the present invention.

Referring now to FIG. 7, a detailed electrical schematic diagram of the rotating assembly 141 of FIG. 4 is shown. Reference characters of like circuit elements are the same in FIGS. 4 and 7. The circuits depicted in FIG. 7 are divided generally into two groups; the circuits shown in the upper portion of FIG. 7 (the longer dimension being oriented horizontally) and designated generally by reference character 54' are rate sensing circuits, the components of which are carried on the annular printed circuit board 54 shown in FIGS. 1 and 2. The circuits depicted in the lower portion of FIG. 7 and designated generally by reference character 56' are acceleration circuits, the components of which are carried on the annular printed circuit board 56 shown in FIGS. 1 and 2. The bender elements 154, 155, 156, 157 of FIG. 6 correspond with the crystal assemblies 36, 38, 50, 52 of FIG. 1. The rate sensing piezoelectric bender elements 154, 155 are connected, respectively, to non-inverting inputs of the buffer amplifiers 160, 161. The rate sensors 154, 155 are mounted diametrically opposed on the rotating assembly 141, and therefore are electrically connected to the respective amplifiers 160, 161 in opposite electrical polarity with respect to each other as indicated by the literal designations A and B adjacent to each sensor 154, 155 in FIG. 7, such that respective output signals at junction points 190, 192 are in phase or additive. A balance potentiometer 194 is utilized during manufacture of the sensor assembly to compensate for any differences in the amplitude of the output signals at terminal points 190, 192; such differences in signal amplitude may be caused by slightly different circuit gains in the amplifiers 160, 161 or by imperfect, i.e., unmatched construction of the piezoelectric crystal assemblies 154, 155.

The acceleration-sensing piezoelectric bender elements 156, 157 are connected, respectively, to non-inverting inputs of the buffer amplifiers 164, 167. The output signal of the buffer amplifier 164 at junction point 200 is coupled to the 90° phase shift circuit 165. The signal output of the phase shift circuit 165 at junction point 202 is coupled via a balance potentiometer 204 to the input of the summing amplifier 166 at junction point 206. The output signal of the buffer amplifier 167 at junction point 208 is coupled via the balance potentiometer 204 to the input 206 of the summing amplifier 166. The piezoelectric bender elements 156, 157 are mounted on the rotating assembly 141 angularly displaced from each other 90°; the circuit 165 shifts the phase of the signal generated by the bender element 156 by 90° so that the respective signals at the junction points 202, 208 are in phase and additive when applied to the input 206 of the summing amplifier 166. Undesirable acceleration components sensed by the acceleration sensors 156, 157 are thereby cancelled in the summing amplifier 166 as previously described with reference to FIG. 5.

Cross-axis accelerations sensed by the rate sensors 154, 155 are compensated for during manufacture of the sensor assembly by signal selection and adjustment in the nulling circuits 170. A portion of the signal at junction point 200 representative of the acceleration sensed by the piezoelectric bender element 156 is coupled via an interboard jumper 212 to one of the input junction points 196, 214 of the summing amplifier 162, the amplitude of the signal being selected by adjustment of a potentiometer 216 and the direction or polarity of the vector being selected by installing an appropriate one of a pair of jumper wires or straps 218. Similarly, a portion of the output signal at junction point 208 representative of linear acceleration sensed by the piezoelectric bender element 157 is coupled via another interboard jumper wire 212 to one or the other of the input junction points 196, 214 of the summing amplifier 162, the amplitude of the coupled signal being selected by adjustment of a potentiometer 220, and the signal polarity being selected by installation of an appropriate one of the jumper wires 218 to connect the coupled signal either to the inverting 196 or the non-inverting 214 input of the summing amplifier 162. The output signal of the summing amplifier 162 at junction point 222 consequently is representative only of the desired angular-rates sensed by the piezoelectric bender elements 154, 155, the cross-axis acceleration components having been nulled out by compensating signals formed in the nulling circuits 170.

The rate signals at the junction points 222 are coupled through a linearizing circuit 224 to the voltage-to-frequency converter 172. The output signal of the voltage-to-frequency converter 172 comprises a series of pulses 4 microseconds wide having a center frequency of approximately 60 kHz which varies in frequency proportional to the applied input voltage. The frequency-modulated output pulse train is coupled to the transformer 174 for transmission off the rotating element 141. The linearizing circuit 224 utilizes feedback from the voltage-to-frequency converter 172 to a node at input junction point 225. The linearizing circuit 224 serves to improve the linearity of the rate signal, the rate signal having an inherently low level compared with the acceleration signal in the prevailing operating environment, i.e., during straight and level flight, when the vehicle experiences a relatively constant one-g acceleration field and comparatively very low rate-signal perturbation. The output signal of the summing amplifier 166 at junction point 210 is coupled to the voltage-to-frequency converter 173. The output signal of the voltage-to-frequency converter 173 is a series of pulses four microseconds wide having a center frequency offset approximately 2 kHz from the center frequency of the voltage-to-frequency converter 172, which center frequency varies in proportion to the applied input voltage. The output signal of the voltage-to-frequency converter 173 is coupled to the transformer 175 for transmission off the rotating assembly 141. The center frequencies of the voltage-to-frequency converters 172, 173 are offset to preclude cross-coupling of the acceleration signals to the rate signal circuits 54' when the aircraft is in straight and level flight and the rate circuits exhibit virtually zero signal output.

The circuits of FIG. 7 utilize commercially available integrated circuit components. The summing amplifiers 160, 161, 164, 167 are LM108A operational amplifiers; the summing amplifiers 162, 166, the phase shift circuit 165 and the linearizing circuit 224 are LM1558 operational amplifiers; the voltage-to-frequency converters 172, 173 are LM131A integrated circuits; all are manufactured by National Semiconductor Corporation. The power supply 146 on the rotating assembly 141 comprises a full wave rectifier utilizing 1N4454 diodes, a positive regulator 226 and a negative regulator 227. The regulators 226, 227 of the presently-described embodiment are, respectively, $\mu$A78M05 and LM120 integrated circuit modules manufactured, respectively, by Fairchild Camera and Instrument Corporation and National Semiconductor Corporation. Unregulated DC is supplied via interboard jumper wires 228 to another set of regulators (not shown) on the acceleration circuit board 56.

While the principles of the invention have been made clear in an illustrative embodiment, there will be immediately obvious to those skilled in the art many modifications of structure, arrangement, proportions, the elements, material and components that may be used in the practice of the invention which are particularly adapted for specific environments without departing from those principles. The appended claims are intended to cover and embrace any such modifications within the scopes only of the true spirit and scope of the invention.

What is claimed is:

1. A sensor assembly, comprising:

an inside-out motor having a central shaft fixed with respect to a major axis of reference of a vehicle, a stator affixed to the shaft, and a rotating element including a motor housing, means for journaling the motor housing to the shaft, the motor housing having a spin axis coaxial with the shaft, and cylindrical means mounted inside the motor housing and juxtaposed with the stator for driving the motor housing, the motor housing being driven at a substantially constant spin frequency in response to alternating current applied to the stator;

a first cantilevered piezoelectric bender element mounted exteriorly on the motor housing for rotation therewith, said first bender element having a bending axis essentially normal to the spin axis of the cylindrical housing and an axis of sensitivity essentially parallel with the spin axis of the motor housing;

second and third cantilevered piezoelectric bender elements mounted exteriorly on the motor housing for rotation therewith, said second and third bender elements each having a bending axis essentially parallel with the spin axis of the motor housing and an axis of sensitivity essentially normal to the spin axis of the motor housing, the axes of sensitivity of said second and said third bender elements being angularly displaced from each other;

a circuit-bearing substrate mounted exteriorly on the motor housing for rotation therewith;

first circuit means on said circuit-bearing substrate responsive to an electrical signal generated by said first bender element for generating a first output signal representative of angular displacement with respect to inertial space of the major axis of reference of said vehicle;

second and third circuit means on said circuit-bearing substrate each responsive to an electrical signal generated, respectively, by said second and said third bender elements for generating, respectively, a second and a third output signal representative of linear acceleration of said vehicle in a plane perpendicular to the major axis of reference of said vehicle, the instantaneous direction of the linear acceleration sensed being along the axes of sensitivity of said second and said third bender elements; means coupled to said first circuit means for selecting a portion of each said second and said third output signals, said first circuit means including means for summing said signal portions with the first output signal to cancel signal components representative of cross-axis accelerations sensed by said first bender element.

2. The sensor assembly as claimed in claim 1, wherein said first circuit means further comprises circuit means for linearizing the first output signal.

3. A sensor assembly, comprising:
a rotating member having an axis of rotation fixed with respect to an axis of reference of a vehicle, said rotating member having a substantially constant frequency of rotation;
a first piezoelectric bender element mounted on said rotating member for rotation therewith, said first bender element having a bending axis essentially normal to the axis of rotation and an axis of sensitivity essentially parallel with the axis of rotation;
first circuit means mounted on said rotating member and responsive to an electrical signal generated by said first bender element for generating a first output signal at the frequency of rotation representative of angular displacement with respect to inertial space of the vehicle, the electrical signal generated by said first bender element and the first output signal including an interfering signal component representative of cross-axis acceleration sensed by said first bender element due to mechanical misalignment of said first bender element;
a second piezoelectric bender element mounted on said rotating member for rotation therewith, said second bender element having a bending axis essentially parallel with the axis of rotation and an axis of sensitivity essentially perpendicular to the axis of rotation;
second circuit means mounted on said rotating member and responsive to an electrical signal generated by said second bender element for generating a second output signal at the frequency of rotation representative of linear acceleration of the vehicle in a plane normal to the axis of rotation;
a third piezoelectric bender element mounted on said rotating member for rotation therewith, said third bender element having a bending axis essentially parallel with the axis of rotation and an axis of sensitivity essentially perpendicular to the axis of rotation, the axis of sensitivity of said third piezoelectric bender element being angularly offset from the axis of sensitivity of said second piezoelectric bender element;
third circuit means mounted on said rotating member and responsive to an electrical signal generated by said third bender element for generating a third output signal at the frequency of rotation representative of linear acceleration of the vehicle in a plane perpendicular to the axis of rotation;
means receiving the first output signal for summing electrical signals;
means selectively coupling portions of the second and the third output signals to said summing means for cancelling the interfering signal component.

4. A sensor assembly, comprising:
a rotating member supported on a vehicle and having an axis of rotation fixed with respect to an axis of reference of the vehicle;
a first cantilevered piezoelectric bender element mounted on said rotating member for rotation therewith, said first bender element generating a first electrical signal at the frequency of rotation of said rotating member and representative of rate of rotation of the vehicle about an axis perpendicular to the axis of rotation, the first electrical signal having an undesired signal component representative of linear acceleration of the vehicle in a plane perpendicular to the axis of rotation sensed by said first bender element as a result of mechanical misalignment of said first bender element with respect to a null axis of said first bender element;
first circuit means mounted on said rotating member and coupled to said first bender element for amplifying said first electrical signal;
a second cantilevered piezoelectric bender element mounted on said rotating member for rotation therewith, said second bender element generating a second electrical signal at the frequency of rotation of said rotating member and representative of linear acceleration of the vehicle in a plane perpendicular to the axis of rotation, said second bender element having an axis of sensitivity in the perpendicular plane;
second circuit means mounted on said rotating member and coupled to said second bender element for amplifying the second electrical signal;
a third cantilevered piezoelectric bender element mounted on said rotating member for rotation therewith, said third bender element generating a third electrical signal at the frequency of rotation of said rotating member and representative of linear acceleration of the vehicle in a plane normal to the axis of rotation, said third bender element having an axis of sensitivity in the normal plane, the axis of sensitivity of said second and said third bender elements being angularly displaced from each other;
third circuit means mounted on said rotating member and coupled to said third bender element for amplifying the third electrical signal;
fourth circuit means mounted on said rotating member coupled to said first circuit means and receiving as one input thereto the amplified first electrical signal for summing electrical signals;
fifth circuit means mounted on said rotating member and coupled to said fourth circuit summing means and to said second and said third circuit means for selectively applying a portion having predetermined amplitude and polarity each of the second and the third electrical signals as second and third input signals to said fourth circuit summing means, the second and the third input signals nulling the undesired component of the first electrical signal in said fourth circuit summing means; and
sixth circuit means for coupling an output signal of said fourth circuit summing means off said rotating member to a utilization means, the output signal being representative of rate of rotation of the vehicle about the axis perpendicular to the axis of rotation.

5. The sensor assembly as claimed in claim 4, wherein said sixth circuit means includes circuit means for linearizing the output signal.

6. A sensor assembly for measuring the angular rate of rotation of a vehicle with respect to inertial space, comprising:

a rotating member supported on the vehicle and having an axis of rotation fixed with respect to the vehicle, said rotating member being driven at a substantially constant frequency of rotation, said rotating member including a first cantilevered piezoelectric bender element having orthogonal null axes essentially perpendicular to the axis of rotation, said first bender element generating a first sinusoidal electrical signal at the frequency of rotation in response to coriolis forces exerted on said bender element in a direction essentially parallel with the axis of rotation due to rotation with reference to inertial space of the vehicle, the first electrical signal being representative of the angular rate of rotation of the vehicle, which first electrical signal may include an interfering signal component representative of cross-axis acceleration due to misalignment of the null axis, said rotating member including a second and a third piezoelectric bender element, each having an axis of sensitivity essentially perpendicular to the axis of rotation and angularly displaced from each other, each of said second and said third bender elements generating a sinusoidal electrical signal at the frequency of rotation representative of linear acceleration in a plane perpendicular to the axis of rotation, each of the second and the third electrical signals having a phased relationship to the other corresponding with the displacement angle, said rotating member including circuit means for selecting portions of the second and the third electrical signals, each of the signal portions having an amplitude and a polarity which when combined will form a signal vector equal and opposite to the interfering signal component, and said rotating member including circuit means for summing the first, the second, and the third electrical signals to cancel the interfering signal component.

* * * * *